United States Patent [19]

Kubota

[11] Patent Number: 5,162,949
[45] Date of Patent: Nov. 10, 1992

[54] LENS FOR AN OPTICAL DISC RECORDING AND/OR REPRODUCING APPARATUS

[75] Inventor: Shigeo Kubota, Tokyo, Japan
[73] Assignee: Sony Corporation, Tokyo, Japan
[21] Appl. No.: 731,451
[22] Filed: Jul. 17, 1991
[30] Foreign Application Priority Data
Jul. 19, 1990 [JP] Japan .................. 2-191149
[51] Int. Cl.$^5$ .......................... G02B 13/18
[52] U.S. Cl. ...................... 359/719; 359/718
[58] Field of Search ............. 359/719, 718, 708
[56] References Cited

U.S. PATENT DOCUMENTS

| | | | |
|---|---|---|---|
| 4,449,792 | 5/1984 | Arai et al. | 359/719 |
| 4,657,352 | 4/1987 | Suda et al. | 359/791 |
| 4,743,093 | 5/1988 | Oinen | 359/708 |
| 4,765,723 | 8/1988 | Takamura | 359/719 |
| 4,828,373 | 5/1989 | Suda et al. | 359/718 |
| 4,932,763 | 6/1990 | Matsuoka | 359/708 |
| 5,004,330 | 4/1991 | Ishibal et al. | 359/708 |
| 5,015,078 | 5/1991 | Oikawa | 359/708 |
| 5,087,115 | 2/1992 | Ishibai et al. | 359/719 |

Primary Examiner—Bruce Y. Arnold
Assistant Examiner—James Phan
Attorney, Agent, or Firm—Philip M. Shaw, Jr.

[57] ABSTRACT

A single focusing lens for an optical disc recording and/or reproducing apparatus, wherein the lens two aspherical surfaces, has a large numerical aperture of about 0.6, and a focal length and a thickness that satisfy following formulas $$0.25 < \tau/f < 0.35$$

$$0.3 < r/t < 0.4$$

where f, t and $\tau$ represent the focal length and the thickness of the single focusing lens and the thickness of the optical disc substrate, respectively.

2 Claims, 3 Drawing Sheets

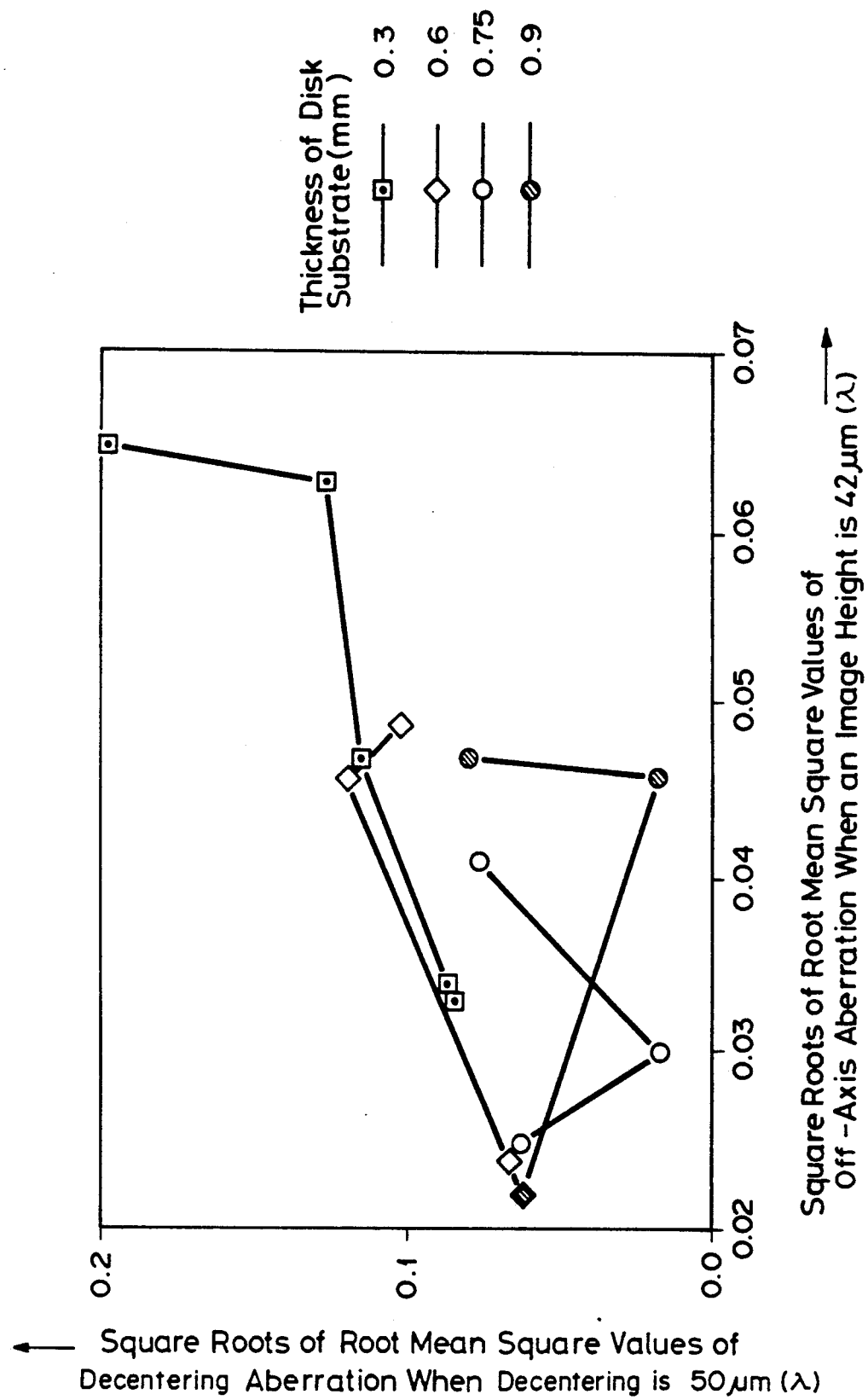

LENS FOR AN OPTICAL DISC RECORDING AND/OR REPRODUCING APPARATUS

BACKGROUND OF THE INVENTION

1. Field of the Invention

The present invention generally relates to a single focusing lens and more particularly to a single focusing lens for an optical disc recording and/or reproducing apparatus.

2. Description of the Prior Art

It has previously been known that a single focusing lens for a high density recording optical disc recording and/or reproducing apparatus is required to be a lens wherein both spherical aberration and coma aberration are satisfactorily corrected, that is, an aplanatic lens.

In case of constituting this focusing lens by a single lens (glass molded lens), both surfaces thereof are made to be aspherical surfaces. But, in this case, there arises coma aberration due to a shift of the optical axis (decentration) between the two aspherical surfaces so that the focusing lens must be designed so as to minimize decentering aberration.

However, such a single focusing lens becomes prone to decentering aberration as its numerical aperture becomes a large value of about 0.6, so that it has been impossible to practically provide the single focusing lens having a large numerical aperture and a small decentering aberration.

OBJECTS AND SUMMARY OF THE INVENTION

Accordingly, it is a general object of the present invention to provide an improved single condenser lens for a high density recording optical disc recording and/or reproducing apparatus in which the aforementioned shortcomings and disadvantages of the prior art can be eliminated.

More specifically, it is an object of the present invention to provide an improved single focusing lens for a high density recording optical disc recording and/or reproducing apparatus in which both surfaces of the lens are aspherical surfaces and the lens has not only a large numerical aperture but is also aplanatic and has minimum decentering aberration.

According to an aspect of the present invention, there is provided a single focusing lens for an optical disc recording and/or reproducing apparatus, wherein the lens has aspherical surfaces at its both surfaces and has a large numerical aperture, and the focal length and the thickness of the single focusing lens are set to satisfy following formulas $$0.25 < \tau/f < 0.35$$

$$0.3 < \tau/t < 0.4$$

where f, t and $\tau$ represent the focal length and the thickness of the single focusing lens and the thickness of the optical disc substrate, respectively.

The above and other objects, features, and advantages of the present invention will become apparent from the following detailed description of an illustrative embodiment thereof to be read in conjunction with the accompanying drawings.

BRIEF DESCRIPTION OF THE DRAWINGS

FIG. 2 is a diagram illustrating characteristics of the single focusing lens.

DETAILED DESCRIPTION OF THE PREFERRED EMBODIMENT

A preferred embodiment of the present invention will now be described with reference to the accompanying drawings.

Figure 1:
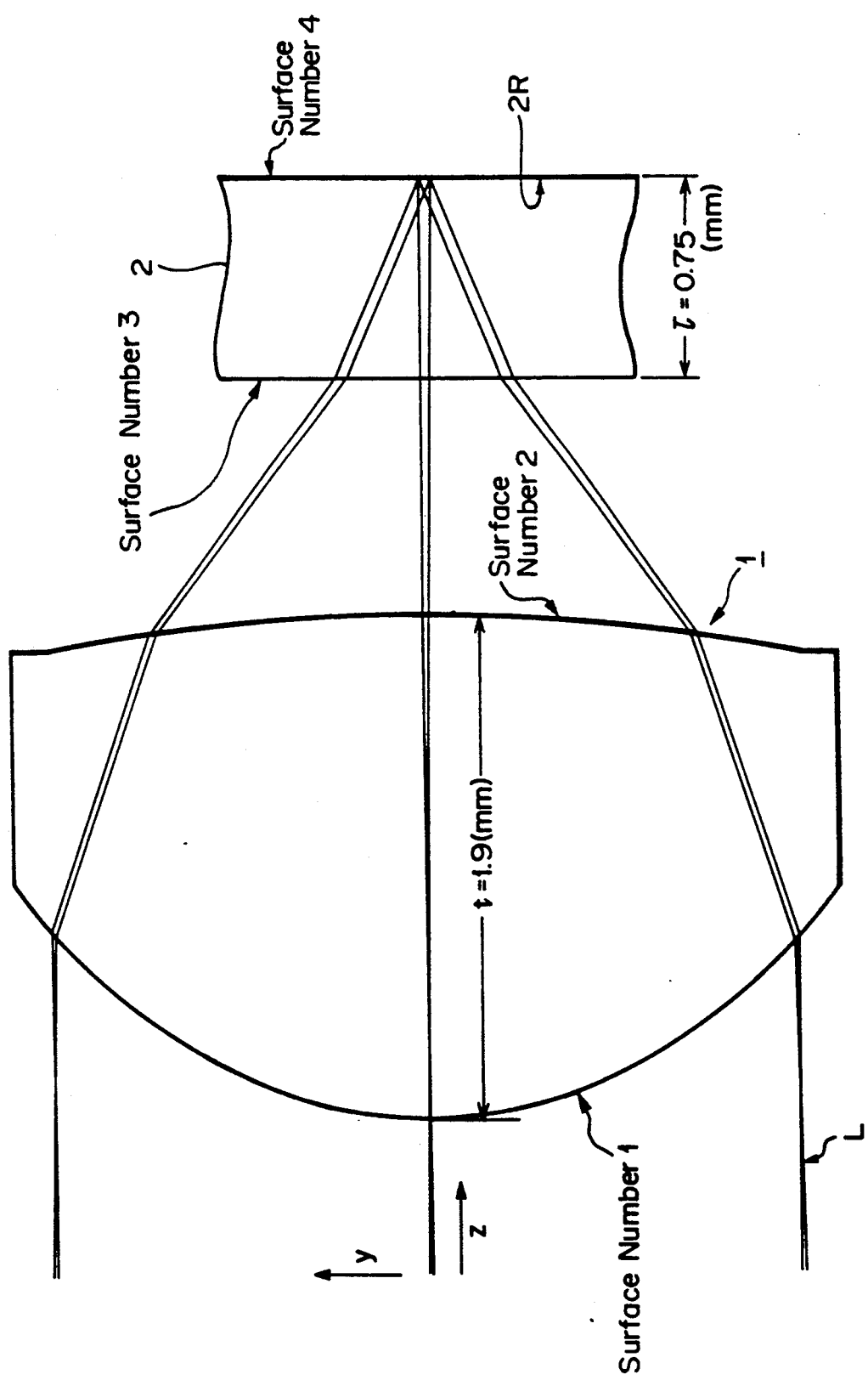
FIG. 1 is a cross-sectional view illustrating an embodiment of a single focusing lens for an optical disc recording and/or reproducing apparatus according to the present invention.

FIG. 1 is a diagram illustrating a preferred embodiment of a single focusing lens 1 according to the present invention and an optical disc substrate 2 opposite to the condenser lens 1.

Referring now to FIG. 1, the single condenser lens 1 which is a glass molded aspherical surface lens, is disposed in an opposing relation to the optical disc substrate 2. The optical disc substrate 2 is made of polycarbonate and has a recording surface 2R opposite the surface facing the lens 1. When plane parallel beam L is incident on a focusing lens 1, the converging beam L' is emitted from the lens 1 and is incident on the optical disc substrate 2 disposed at a suitable working distance from the focusing lens 1, and is focused on the recording surface 2R of the disc 2.

Explanation will be made of a method of designing the single focusing lens 1.

The optical disc substrate 2 through which the beam L' emitted from the focusing lens 1 passes constitutes a part of an imaging optical system. Thus, even in the conventional design of an aspherical lens for the pickup of an optical disc recording and/or reproducing apparatus, the overcorrection of spherical aberration, caused when the converging beam passes through the optical disc substrate has been taken into consideration when designing the focusing lens.

In this case, the thickness of the optical disc substrate 2 is positively taken into consideration in the design of an aspherical focusing lens, with a large numerical aperture for use in a high density recording optical disc recording and/or reproducing apparatus, that is aplanatic and has minimum decentering aberration.

The aplanatic condition, i.e. the condition for satisfying aplanatism, and the decentering aberration will be shown in the range of primary aberration as follows.

1) The aplanatic condition will be represented as follow.

$$SC = SC1 + SC2 \qquad + SC3 + SC4 \quad (1)$$
$$= SCs1 + SCa1 + SCs2 + SCa2 + SC3 + SC4$$
$$CC = CC1 + CC2 \qquad + CC3 + CC4 \quad (2)$$
$$= CCs1 \qquad + CCs2 + CCa2 + CC3 + CC4$$
$$CCs\mu/SCs\mu = i\mu/i\mu \quad (3)$$
$$CCa\mu/SCa\mu = \underline{Y}\mu/Y\mu \quad (4)$$

where $\mu = 1$, 2 represents the surface number of the surfaces of the aspherical lens 1, $\mu = 3$, 4 represents the surface number of the surfaces of the optical disc substrate 2, SC and CC represent sum of the spherical aberration and the coma aberration, respectively, SC$\mu$ and CC$\mu$ represent contribution components of SC and CC of the surface having the surface number $\mu$ respectively, SCs$\mu$ and CCs$\mu$ represent contribution components of the spherical surface to SC$\mu$ and CC$\mu$ respectively, and SCa$\mu$ and CCa$\mu$ represent contribution components of the aspherical surface to SC$\mu$ and CC$\mu$, respectively. Further, i$\mu$ and i$\mu$ represent slope angles of the surface having the surface number $\mu$ of paraxial rays and principal rays respectively, and Y$\mu$ and $\underline{Y}\mu$ represent ray heights on the surface having the surface number $\mu$ of paraxial rays and principal rays respectively.

2) The decentering aberration will be represented as follow.

$$S1 = \tfrac{1}{3}\alpha 1'(CC - CC1) + \alpha 1' SC1 \quad (5)$$

$$S2 = \tfrac{1}{3}\alpha 1'(CC - CC1) + \alpha 1'(SC - SC1) \quad (6)$$

where $\alpha\mu$ and $\underline{\alpha}\mu$ are set to be $n i\mu$ and $n i\underline{\mu}$ respectively. Thus, following formula can be obtained $$S1 + S2 = \alpha 1' SC \quad (7)$$

Now, in the aplanatic lens, SC will be $\simeq 0$ since the spherical aberration can be corrected preferably. Thus, $S1 + S2 \simeq 0$ will be satisfied, so that if $S1 \simeq 0$ is satisfied, $S2 \simeq 0$ is established at the same time. Accordingly, it is merely required to investigate whether solutions (SC1, SC2) satisfying $S1 \simeq 0$ satisfy $SC \simeq 0$ and $CC \simeq 0$ in the remaining formulas (1) and (2) representing the aplanatic condition.

Incidentally, it has been reported that, when the numerical aperture (NA) of a lens is small, practical solutions already exist with respect to an optical disc with a pregiven thickness. However, when the numerical aperture of a lens is large, both the off-axis aberration and the decentering aberration become large and so these solutions are not practically sufficient. Thus, the thickness of the optical disc substrate 2 is changed while maintaining the focal length of the lens constant to change (SC3+SC4) and (CC3+CC4) on the right sides of equations (1) and (2). A solution is obtained which satisfies $S1 \simeq 0$ in the formula (5) defining the conditions for minimum decentering aberration, and also satisfies the aplanatic condition more strictly, as described below.

As shown in FIG. 1, the thickness of the center portion of the lens 1, in which both surfaces are aspherical and which has a focal length of f=2.4 (mm) and a numerical aperture NA=0.6, is varied to be optimized with an optical disk substrate 2 having a thickness $\tau$ in the range of 0.3~0.9 mm. It is found that around the disc thickness $\tau$=0.75 mm there is an optimum lens thickness, that is, a lens center thickness t, at which both the off-axis aberration (image height 42 $\mu$m) and decentering aberration (decentering 50 $\mu$m) become small. In practice, it is found that both aberrations are minimized when the lens center thickness is t=1.9 mm. Now, in this case the focal length is fixed but it is not essential.

Accordingly, it will be understood that, in order to obtain a solution satisfying both minimum decentering aberration and the aplanatic condition, a disc thickness $\tau$ normalized by a focal length f, that is, $\tau/f$, is in a following range and that in this case a lens center thickness t minimizing the sensitivity of the decentering error exists in a range $0.3 < \tau/t < 0.4$.

$$0.25 < \tau/f < 0.35 \quad (8)$$

Now, the range of the inequality is generally the function of a numerical aperture NA but the inequality (8) is considered to be effective when the NA is about 0.6.

An example of the specification of a thus optimized lens will be shown below.

| | |
|---|---|
| wave length of a laser light: | $\lambda$ = 780 (nm) |
| focal length: | f = 2.4 (mm) |
| numerical aperture: | NA = 0.6 |
| radius of curvature of approximated ellipsoid[1] of revolution: | R1 = 1.6477545 (mm) |
| thickness of center portion: | CT = 1.9 (mm) |
| thickness of peripheral portion: | ET = 0.84 (mm) |
| refractive index of the lens: | Ng = 1.582509 |
| radius of curvature of approximated hyperboloid[2] of revolution: | R2 = −5.3091039 (mm) |
| working distance between the lens and disc substrate: | WD = 0.903175 (mm) |
| refractive index of the disc substrate (polycarbonate): | Nd = 1.57 |
| thickness of the disc substrate: | $\tau$ = 0.75 (mm) |

When the formula of an aspherical surface is defined as follow:

$$z = cy^2/[1 + \{1 - (1+K)c^2 y^2\}^{\frac{1}{2}}] + Ay^4 + By^6 + Cy^8 + Dy^{10}, \quad c = 1/r$$

1) respective coefficients of the approximated ellipsoid[1] of revolution will be listed below:

$K = -0.279372$ (K: conic constant)

$A = -0.75198e - 2$ (mm$^{-4}$)

$B = -0.313881e - 2$ (mm$^{-6}$)

$C = +0.452206e - 3$ (mm$^{-8}$)

$D = -0.434638e - 3$ (mm$^{-10}$)

2) respective coefficients of the approximated hyperboloid[2] of revolution will be as follows:

$K = -23.231301$ $A = 0.706198e - 2$ (mm$^{-4}$)

$B = -0.186959e - 2$ (mm$^{-6}$)

$C = -0.111016e - 3$ (mm$^{-8}$)

$D = 0.6295059e - 3$ (mm$^{-10}$)

The efficiency of the lens thus formed under the specification will be as follow

| | |
|---|---|
| aberration of wave surface on axis: | 0.002 rms $\lambda$ |
| aberration of wave surface off axis: | 0.03 rms $\lambda$ (image height 42 $\mu$m) |
| decentering aberration: | 0.017 rms $\lambda$ (decentering 50 $\mu$m) |

Thus, the lens is quite preferable in efficiency of both the aberrations of wave surface on and off axis and so sufficient for being called as a lens with complete aplanatic property, and further the decentering aberration thereof is sufficiently suppressed.

If the above-described third-order aberration and third-order decentering aberration are introduced, target solutions thereof are obtained as listed bellow.

|  | $\mu = 1$ | $\mu = 2$ | $\mu = 3,4$ | sum |
| --- | --- | --- | --- | --- |
| SCs$\mu$ | −0.186295 | −0.156651 | 0.030662 |  |
| SCa$\mu$ | 0.0255905 | 0.048499 | 0. |  |
| SC$\mu$ | 0.06961 | −0.108152 | 0.030662 | −0.00788 |
| CCs$\mu$ | −0.011163 | 0.006966 | −0.002323 |  |
| CCa$\mu$ | 0. | 0.003679 | 0. |  |
| CC$\mu$ | −0.011163 | 0.020645 | −0.002323 | −0.002841 |
| a$\mu$ | 0. | −0.5090647 | −0.6 |  |
| a$\mu$ | 0.017455 | 0.017455 |  |  |
| s$\mu$ | 0.001215 | −0.001352 | (unit: mm) |  |

Now, since values of $\tau$ and f are 0.75 and 2.4 respectively, $\tau$/f will be 0.3125.

FIG. 2 is a characteristic diagram, wherein ordinate represents square roots of root mean square values of decentering aberration when decentering is 50 $\mu$m, while abscissa represents square roots of root mean square values of off-axis aberration when an image height is 42 $\mu$m, for respective values 0.3 mm, 0.6 mm, 0.75 mm and 0.9 mm of the thickness of the disc substrate 2. In this case, the best value is obtained when the thickness of the disc substrate 2 is 0.75 mm and the second best value is obtained which the thickness is 0.6 mm.

Figure 3A:
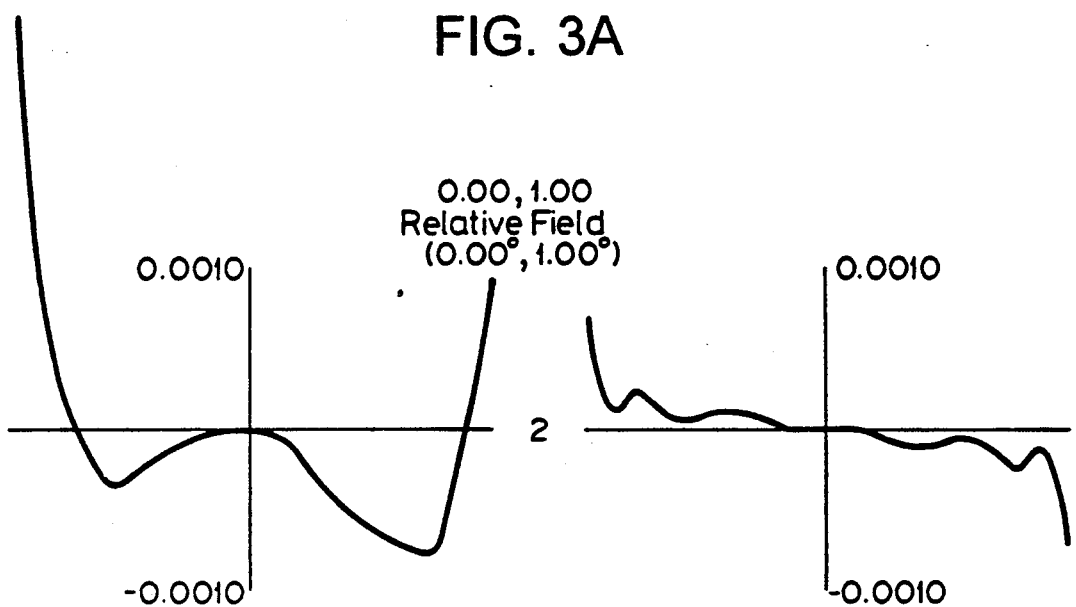
FIGS. 3A and 3B are respectively diagrams illustrating aberration characteristics of the single focusing lens shown in FIG. 1.
Figure 3B:
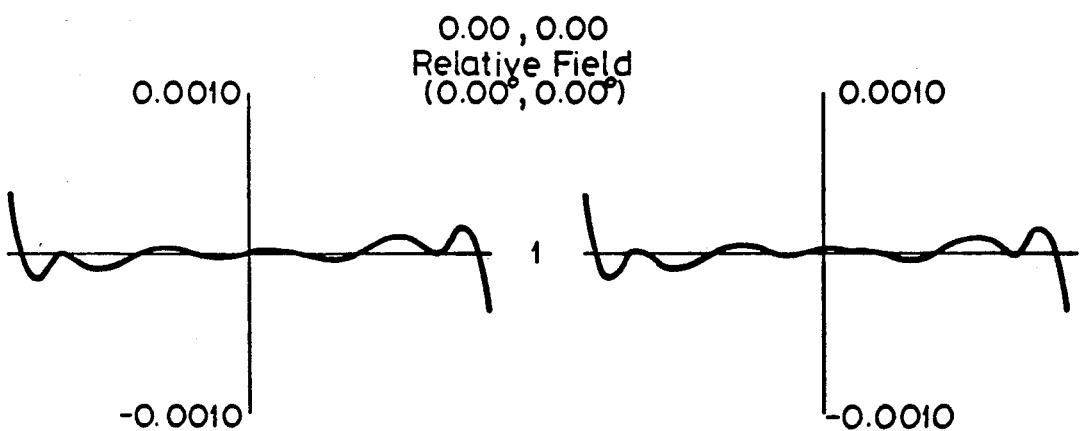

FIGS. 3A and 3B are aberration diagrams of the focusing lens 1 with a focal length f=2.4 (mm), numerical aperture NA=0.6 and working distance WD=0.9 (mm), wherein the abscissa of each of FIGS. 3A and 3B represents the relative entrance pupil radius and the ordinates of FIGS. 3A and 3B represent the component within the tangential plane of the off-axis transversal aberration, the component within the sagittal surface of the off-axis transversal aberration, the component within the tangential plane of the transversal aberration on the axis, and the component within the sagittal surface of the transversal aberration on the axis, respectively.

As described above, according to the present invention, in a single focusing lens for use with a high density optical disc recording and/or reproducing apparatus whose both surfaces are aspherical surfaces and which has a large numerical aperture, the focal length and the thickness of the single condenser lens are set to satisfy the following formulas $$0.25 < \tau/f < 0.35$$

$$0.3 < \tau/t < 0.4$$

where f, t and $\tau$ represent the focal length and the thickness of the single focusing lens and the thickness of the optical disc substrate, respectively. Thus, a single focusing lens thus designed can satisfy both the aplanatic property and the condition required for minimum decentering aberration.

Having described a preferred embodiment of the invention with reference to the accompanying drawings, it is to be understood that the invention is not limited to those precise embodiment and that various changes and modifications could be effected by one skilled in the art without departing from the spirit or scope of the invention as defined in the appended claims.

I claim as my invention:

1. A single focusing lens for an apparatus for recording and/or reproducing an optical disc having a substrate of a known thickness, the focusing lens comprising:
    a first aspherical surface; and
    a second aspherical surface;
        wherein the focusing lens has;
            a focal length such that the thickness of the substrate of the optical disc divided by the focal length is between 0.25 and 0.35,
            a lens thickness such that the thickness of the substrate of the optical disc divided by the lens thickness is between 0.3 and 0.4, and
            a numerical aperture substantially equal to 0.6.

2. A single focusing lens for an apparatus for recording and/or reproducing an optical disc, the focusing lens comprising:
    a first aspherical surface; and
    a second aspherical surface;
        wherein the focusing lens has:
            the following parameters in the first aspherical surface:

$K = -0.279372$ (K: conic constant)

$A = -0.75198e-2$ (mm$^{-4}$)

$B = -0.313881e-2$ (mm$^{-6}$)

$C = +0.452206e-3$ (mm$^{-8}$)

$D = -0.434638e-3$ (mm$^{-10}$), and the following parameters in the second aspherical surface:

$K = -23.231301$ K: conic constant)

$A = 0.706198e-2$ (mm$^{-4}$)

$B = -0.186959e-2$ (mm$^{-6}$)

$C = -0.111016e-3$ (mm$^{-8}$)

$D = 0.6295059e-3$ (mm$^{-10}$), an optical axis and a lens thickness near the optical axis of 1.9 millimeters,
a refractive index of 1.582509 at a wavelength of 780 nanometers, and wherein
the first aspherical surface and the second aspherical surface each have a radius of curvature, and are each defined by the relationship:

$$z = cy^2/(1+\{1-(1+K)c^2y^2\}^{\frac{1}{2}}) + Ay^4 + By^6 + Cy^8 + Dy^{10}, \ c=1/r,$$

where z is the direction of the optical axis, y is the direction perpendicular to the optical axis, and r is the radius of curvature of the aspherical surface.

* * * * *